US011867798B2

(12) United States Patent
Nikishov et al.

(10) Patent No.: US 11,867,798 B2
(45) Date of Patent: Jan. 9, 2024

(54) ELECTRONIC DEVICE INCLUDING SENSOR AND METHOD OF DETERMINING PATH OF ELECTRONIC DEVICE

(71) Applicant: Samsung Electronics Co., Ltd., Suwon-si (KR)

(72) Inventors: Artem Yurievich Nikishov, Moscow Region (RU); Andrey Vladimirovich Kletsov, Moscow (RU); Alexander Gennadievich Chernokalov, Moscow Region (RU); Ekaterina Igorevna Semernya, Moscow Region (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 17/018,382

(22) Filed: Sep. 11, 2020

(65) Prior Publication Data

US 2021/0080564 A1    Mar. 18, 2021

(30) Foreign Application Priority Data

Sep. 13, 2019   (RU) ............................... 2019128918
Sep. 3, 2020    (KR) ........................ 10-2020-0112547

(51) Int. Cl.
G01S 13/88      (2006.01)
G06T 7/70       (2017.01)
(Continued)

(52) U.S. Cl.
CPC .............. *G01S 13/885* (2013.01); *G01S 7/03* (2013.01); *G01S 13/0209* (2013.01);
(Continued)

(58) Field of Classification Search
CPC ...... G01S 13/885; G01S 7/03; G01S 13/0209; G01S 13/865; G01S 13/867; G06T 7/70; H04N 5/232; H04N 5/76
(Continued)

(56) References Cited

U.S. PATENT DOCUMENTS

| 5,815,278 A | * | 9/1998 | Johnston ............... G01N 21/553 |
| | | | 385/12 |
| 5,892,163 A | * | 4/1999 | Johnson ................... G01M 3/02 |
| | | | 73/865.8 |

(Continued)

FOREIGN PATENT DOCUMENTS

| JP | 5032910 B2 | 2/2009 |
| JP | 2013-178150 A | 9/2013 |

(Continued)

OTHER PUBLICATIONS

Russian Office Action dated Feb. 13, 2020, issued in Russian Patent Application No. 2019128918/28.

(Continued)

*Primary Examiner* — Nuzhat Pervin
(74) *Attorney, Agent, or Firm* — Jefferson IP Law, LLP

(57) ABSTRACT

An electronic device and a method of determining a path of the electronic device is provided. The method includes emitting a signal in a direction of a surface and receiving a signal reflected from the surface or a subsurface, obtaining an image of a structure of the surface or a structure of the subsurface, based on the received signal; when it is possible to determine a location of the electronic device based on the obtained image and an image pre-stored in the electronic device, determining the location of the electronic device, and when it is impossible to determine the location of the electronic device based on the obtained image and the image pre-stored in the electronic device, obtaining surrounding environment information of the electronic device by using a (Continued)

second sensor and determining the location of the electronic device.

19 Claims, 12 Drawing Sheets

(51) Int. Cl.
| | | |
|---|---|---|
| G01S 13/02 | (2006.01) | |
| G01S 13/86 | (2006.01) | |
| G01S 7/03 | (2006.01) | |
| H04N 5/76 | (2006.01) | |
| H04N 23/60 | (2023.01) | |

(52) U.S. Cl.
CPC .......... *G01S 13/865* (2013.01); *G01S 13/867* (2013.01); *G06T 7/70* (2017.01); *H04N 5/76* (2013.01); *H04N 23/60* (2023.01)

(58) Field of Classification Search
USPC .......................................................... 342/22
See application file for complete search history.

(56) References Cited

U.S. PATENT DOCUMENTS

| | | | | |
|---|---|---|---|---|
| 6,657,577 B1* | 12/2003 | Gregersen | ................ | G01V 3/12 343/793 |
| 6,701,647 B2* | 3/2004 | Stump | .................... | E02F 9/262 37/348 |
| 6,914,552 B1* | 7/2005 | McEwan | ................ | G01S 13/86 342/28 |
| 8,055,193 B2* | 11/2011 | Rhodes | .................. | H04B 13/02 343/719 |
| 8,493,198 B1* | 7/2013 | Vasquez | ................... | G08G 1/16 340/436 |
| 8,949,024 B2* | 2/2015 | Stanley | ................. | G01S 13/885 340/995.22 |
| 9,253,592 B1* | 2/2016 | Moscovich | ............. | H04W 4/80 |
| 9,678,236 B2* | 6/2017 | Rodney | ................... | G06F 17/00 |
| 9,804,598 B2* | 10/2017 | Yoshino | .............. | A47L 11/4011 |
| 10,423,163 B2* | 9/2019 | Choi | .................... | A47L 9/2826 |
| 10,539,956 B2* | 1/2020 | Baiden | .................. | G01C 11/00 |
| 11,385,343 B1* | 7/2022 | Kaya | .................... | H01Q 21/08 |
| 11,650,302 B2* | 5/2023 | Sautermeister | ......... | G01S 7/354 73/290 R |
| 2003/0033869 A1* | 2/2003 | Laun | ................... | G01F 23/2965 73/290 V |
| 2003/0043067 A1* | 3/2003 | Johansson | .......... | G01S 13/0209 342/22 |
| 2008/0278370 A1* | 11/2008 | Lachner | ................. | G01S 13/87 342/200 |
| 2010/0109938 A1* | 5/2010 | Oswald | ................. | G01S 13/522 707/E17.014 |
| 2011/0128546 A1* | 6/2011 | Couillard | ............. | G01N 21/553 356/445 |
| 2011/0163905 A1* | 7/2011 | Denis | .................. | G01S 13/0209 342/146 |
| 2011/0171746 A1* | 7/2011 | Fontaine | ............... | G01N 21/553 436/164 |
| 2011/0191058 A1* | 8/2011 | Nielsen | ................... | G01C 15/02 702/141 |
| 2011/0248899 A1* | 10/2011 | Bourtoutian | ........... | H01Q 9/285 343/795 |
| 2012/0140061 A1* | 6/2012 | Zeng | ..................... | G01S 13/726 348/148 |
| 2013/0050011 A1* | 2/2013 | Kim | ........................ | G01S 7/412 342/195 |
| 2013/0116926 A1* | 5/2013 | Rodney | ................... | G06F 17/00 702/8 |
| 2015/0241560 A1* | 8/2015 | Lee | ........................ | G01S 13/867 701/454 |
| 2015/0380826 A1* | 12/2015 | Yang | ........................ | H01Q 5/25 343/846 |
| 2016/0223669 A1* | 8/2016 | Assefzadeh | ......... | G01S 13/0209 |
| 2017/0001732 A1* | 1/2017 | Lim | ........................ | G05D 1/0684 |
| 2017/0243448 A1* | 8/2017 | You | .......................... | H04L 12/00 |
| 2017/0302248 A1* | 10/2017 | Feng | ........................ | G01S 5/015 |
| 2017/0359525 A1* | 12/2017 | Weil | ........................ | G06T 7/0004 |
| 2018/0039263 A1* | 2/2018 | Baiden | .................... | G05D 1/028 |
| 2018/0217231 A1 | 8/2018 | Stanley et al. | | |
| 2018/0217251 A1* | 8/2018 | Stanley | ................ | B60W 40/064 |
| 2018/0218710 A1* | 8/2018 | Park | .......................... | G09G 5/00 |
| 2018/0249062 A1* | 8/2018 | Jin | ........................ | H04N 23/69 |
| 2019/0193629 A1* | 6/2019 | Zevenbergen | ......... | B60Q 1/525 |
| 2019/0265015 A1* | 8/2019 | Michiwaki | ............... | G01B 7/16 |
| 2019/0331785 A1* | 10/2019 | Hewett | ................ | G01S 5/0215 |
| 2020/0057488 A1* | 2/2020 | Johnson | .................. | G06T 17/00 |
| 2020/0059010 A1* | 2/2020 | Yang | ........................ | H01Q 1/48 |
| 2020/0287291 A1* | 9/2020 | Yang | ........................ | H01Q 1/523 |
| 2020/0331465 A1* | 10/2020 | Herman | ................ | G08G 1/161 |
| 2020/0355821 A1* | 11/2020 | Stanley | ................ | G01S 13/885 |
| 2020/0409372 A1* | 12/2020 | Yu | .......................... | B60W 40/04 |
| 2021/0035279 A1* | 2/2021 | Hu | ........................ | H04N 17/002 |
| 2021/0080230 A1* | 3/2021 | Manneschi | ........... | F41H 11/136 |
| 2022/0392211 A1* | 12/2022 | Johnson | ................ | G06V 10/26 |

FOREIGN PATENT DOCUMENTS

| | | | | |
|---|---|---|---|---|
| RU | 160 453 U1 | 3/2016 | | |
| RU | 2 622 488 C1 | 6/2017 | | |
| WO | WO-2017181643 A1 * | 10/2017 | ........... | G01S 13/865 |
| WO | WO-2021096219 A1 * | 5/2021 | ............ | G01S 17/86 |

OTHER PUBLICATIONS

Russian Decision to grant dated May 21, 2020, issued in Russian Patent Application No. 2019128918/28.

* cited by examiner

ELECTRONIC DEVICE INCLUDING SENSOR AND METHOD OF DETERMINING PATH OF ELECTRONIC DEVICE

CROSS-REFERENCE TO RELATED APPLICATION(S)

This application is based on and claims priority under 35 U.S.C. § 119(a) of a Russian patent application number 2019128918, filed on Sep. 13, 2019, in the Russian Intellectual Property Office, and priority under 35 U.S.C. § 119(a) of a Korean patent application number 10-2020-0112547, filed on Sep. 3, 2020, in the Korean Intellectual Property Office, the disclosure of each of which is incorporated by reference therein in their entireties.

BACKGROUND

1. Field

The disclosure relates to a method of determining a path of an electronic device, such as robotics navigation. More particularly, the disclosure relates to an electronic device including a sensor such as a ground-penetrating radar (GPR) sensor, and a method of determining a path of an electronic device by using a sensor.

2. Description of Related Art

With the recent development of navigation technology, sensor technology used to search for an apparatus has been introduced and robotic cleaners or the like including a sensor have been developed. By using such a sensor, a path (track) of a robot may be planned, a map for moving from an arbitrary place may be generated, or a map may be updated by monitoring a current location and a loop in which a robot moved in a place with a pre-generated map. However, various general sensors have different limitations, for example, a robot losing its position.

In a general technology, light detection and ranging (LIDAR) sensor is used as a sensor for robot navigation. A main drawback of LIDAR is an error of positional orientation loss caused by the presence of an area not perceived by LIDAR or an area mis-perceived by LIDAR due to re-reflection. Also, using LIDAR, it is difficult to perceive an object with a glass surface, a black surface, or a low profile.

U.S. Pat. No. 8,949,024 B2 discloses vehicle localization using surface penetrating radar (SPR) to determine whether a vehicle is on a desired path. Vehicle localization includes an operation of obtaining an SPR image of a subsurface region along a track of the vehicle. The obtained SPR image is compared to an SPR image previously obtained for a part of a surface that at least partially overlaps the subsurface region along the track of the vehicle. The comparison includes a correlation procedure of an image. Location data of the vehicle is determined based on a part of location data of an SPR image previously obtained for a second subsurface region. The location data may be used to guide the vehicle along a desired path.

However, to successfully determine whether the vehicle is on the desired path, the vehicle needs to at least partially move along a path along which the vehicle previously moved to train radar. In other words, the path of the vehicle needs to at least partially overlap the surface collected by a reference SPR image. In addition, by using a known solution, it is impossible to detect a low-profile object or an object such as spilled fluid, and it is also impossible to determine a material of a surface.

Russian Patent No. 2622488 C1 discloses a surface sensing antenna. Russian Patent No. 2622488 C1 discloses a microwave wideband antenna for use in non-contact ultra-wideband radar, for 3-dimensional (3D) or 2D visualization of a subsurface structure. A drawback of such a technology is low efficiency of general radar due to the use of an antenna.

Accordingly, there is a need for a technical solution that increases stability and efficiency of robotics navigation, is operable even when a camera is absent, repeatedly determines a location of a device, is operable both in small and wide spaces, and is cheap, compact, and fast.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a ground-penetrating radar (GPR) sensor that is capable of reducing an overall size by reducing a wiring length as a transmitter and a receiver are directly arranged on an antenna and has increased stability and efficiency by reducing parasitic reflection caused by wiring, and a method of determining a path of the electronic device.

Another aspect of the disclosure is to provide a method of determining a path of an electronic device capable of identifying a structure and material of a bottom floor of the electronic device by including a GPR sensor, capable of detecting an object with a low profile by dynamically modifying a database by using data obtained via the GPR sensor and another embedded active sensor, and capable of improving path determination indoors.

Additional aspects will be set forth in part in the description which follows and, in part, will be apparent from the description, or may be learned by practice of the presented embodiments.

In accordance with an aspect of the disclosure, a method of determining a path of an electronic device is provided. The method includes emitting a signal in a direction of a surface by using a first sensor and receiving a signal reflected from a structure of the surface or a structure of a subsurface, obtaining an image of the structure of the surface or the structure of the subsurface, based on the received signal, when it is possible to determine a location of the electronic device based on the obtained image and an image pre-stored in the electronic device, determining the location of the electronic device, and when it is impossible to determine the location of the electronic device based on the obtained image and the image pre-stored in the electronic device, obtaining surrounding environment information of the electronic device by using a second sensor, and determining the location of the electronic device from the obtained surrounding environment information, and in response to the determining of the location of the electronic device from the obtained surrounding environment information, storing the obtained image and the determined location of the electronic device.

The determining of the location of the electronic device when it is possible to determine the location of the electronic device based on the obtained image and the image pre-stored in the electronic device may include when the obtained image and the image pre-stored in the electronic device match each other, determining the location of the electronic device based on location information of the image pre-stored in the electronic device. The method may further include, when it is impossible to determine the location of the electronic device from the surrounding environment information obtained by the second sensor, outputting information indicating a loss of orientation of the electronic device. The storing of the obtained image and the determined location of the electronic device in response to the determining of the location of the electronic device from the obtained surrounding environment information may include selecting a first mode or a second mode, based on whether the image pre-stored in the electronic device exists, wherein the first mode may include updating a database by adding, to the database, the obtained image and the determined location of the electronic device, and the second mode may include determining that the structure of the surface has changed, and updating the database by changing a pre-stored image corresponding to the determined location of the electronic device to the obtained image.

In accordance with another aspect of the disclosure, an electronic device for determining a path is provided. The device includes a first sensor configured to obtain an image of a structure of a surface or a structure of a subsurface, at least one second sensor configured to obtain surrounding environment information of the electronic device, a memory storing a program including at least one instruction, and at least one processor configured to execute the at least one instruction stored in the memory. The at least one processor is configured to control the first sensor to emit a signal in a direction of a surface and receive a signal reflected from a structure of the surface or a structure of a subsurface, obtain an image of the structure of the surface or the structure of the subsurface, based on the received signal, when it is possible to determine a location of the electronic device based on the obtained image and an image pre-stored in the memory, determine the location of the electronic device, and when it is impossible to determine the location of the electronic device based on the obtained image and the image pre-stored in the memory, control the at least one second sensor to obtain surrounding environment information of the electronic device, determine the location of the electronic device from the obtained surrounding environment information, and in response to the determining of the location of the electronic device from the obtained surrounding environment information, store the obtained image and the determined location of the electronic device in the memory.

The first sensor may be a ground-penetrating radar (GPR) sensor. The first sensor may include at least one antenna, at least one transmitter, and at least one receiver. The first sensor may further include a micro-controller. The antenna may include a current redistribution layer and a transceiver layer including two or more arms. The two or more arms may be configured to switch between a transmitting state and a receiving state. The at least one transmitter and the at least one receiver may be each located directly on the two or more arms.

The at least one antenna may be an ultra-wideband (UWB) microwave antenna. The transceiver layer may be a butterfly type. At least one of the at least one receiver may be located on one of the two or more arms and at least one of the at least one transmitter may be located on another one of the two or more arms. At least one of the at least one receiver and at least one of the at least one transmitter may be located on one of the two or more arms. A pair of one of the at least one receiver and one of the at least one transmitter may be located on one of the two or more arms and a pair of another one of the at least one receiver and another one of the at least one transmitter may be located on another one of the two or more arms. A pair of one of the at least one receiver and one of the at least one transmitter may be located on one of the two or more arms and another at least one of the at least one transmitter may be located on another one of the two or more arms. A pair of one of the at least one receiver and one of the at least one transmitter may be located on one of the two or more arms and at least another one of the at least one receiver may be located on another one of the two or more arms.

The first sensor may be located on a bottom surface of the electronic device. The first sensor may be arranged on the electronic device at a pre-set angle from the surface. The first sensor may be located on a front surface of the electronic device. The first sensor may be located on a rear surface of the electronic device. The second sensor may be an active sensor configured to obtain surrounding environment information of the electronic device. The second sensor may include at least one of a camera or a light detection and ranging (LIDAR) sensor.

In accordance with another aspect of the disclosure, a method of determining a path of an electronic device is provided. The method includes emitting electromagnetic radiation in a form of a radio frequency signal in a direction of a surface where the electronic device is moving, receiving electromagnetic radiation reflected from a structure of the surface or a structure of a subsurface, wherein the received electromagnetic radiation reaches a receiver of a ground-penetrating radar (GPR) sensor and an output signal of the receiver of the GPR sensor is supplied to a micro-controller, obtaining an image of the structure of the surface or the structure of the subsurface, based on the output signal of the receiver of the GPR sensor, comparing the obtained image and an image pre-stored in a database of the electronic device, when it is determined that there is a correlation between the image obtained by the GPR sensor and the image pre-stored in the database, determining a location of the database based on coordinates of the image pre-stored in the database, when it is determined that there is no correlation between the image obtained by the GPR sensor and the image pre-stored in the database, determining whether it is possible to obtain data by another active sensor of the electronic device, when it is impossible to obtain the data by the other active sensor of the electronic device, notifying a user of a loss of orientation, and when it is possible to obtain the data by the other active sensor of the electronic device, storing, in the database, the image obtained by the GPR sensor and a corresponding location of the electronic device.

The method may further include, when it is determined that there is no correlation between the image obtained by the GPR sensor and the image pre-stored in the database and it is possible to obtain the data by the other active sensor of the electronic device, or when an image of the path is pre-stored in the database but the obtained image is changed while the electronic device passes the path and thus no longer correlates with the image pre-stored in the database, determining that the structure of the surface of the path is changed. The electronic device may be a robotic cleaner. When it is determined that the structure of the surface has changed at a certain section of the path, a "contamination removal" command is provided to the robotic cleaner and when it is determined that an image of the certain section of the path correlates with the image pre-stored in the database again, execution of the "contamination removal" command may be ended.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
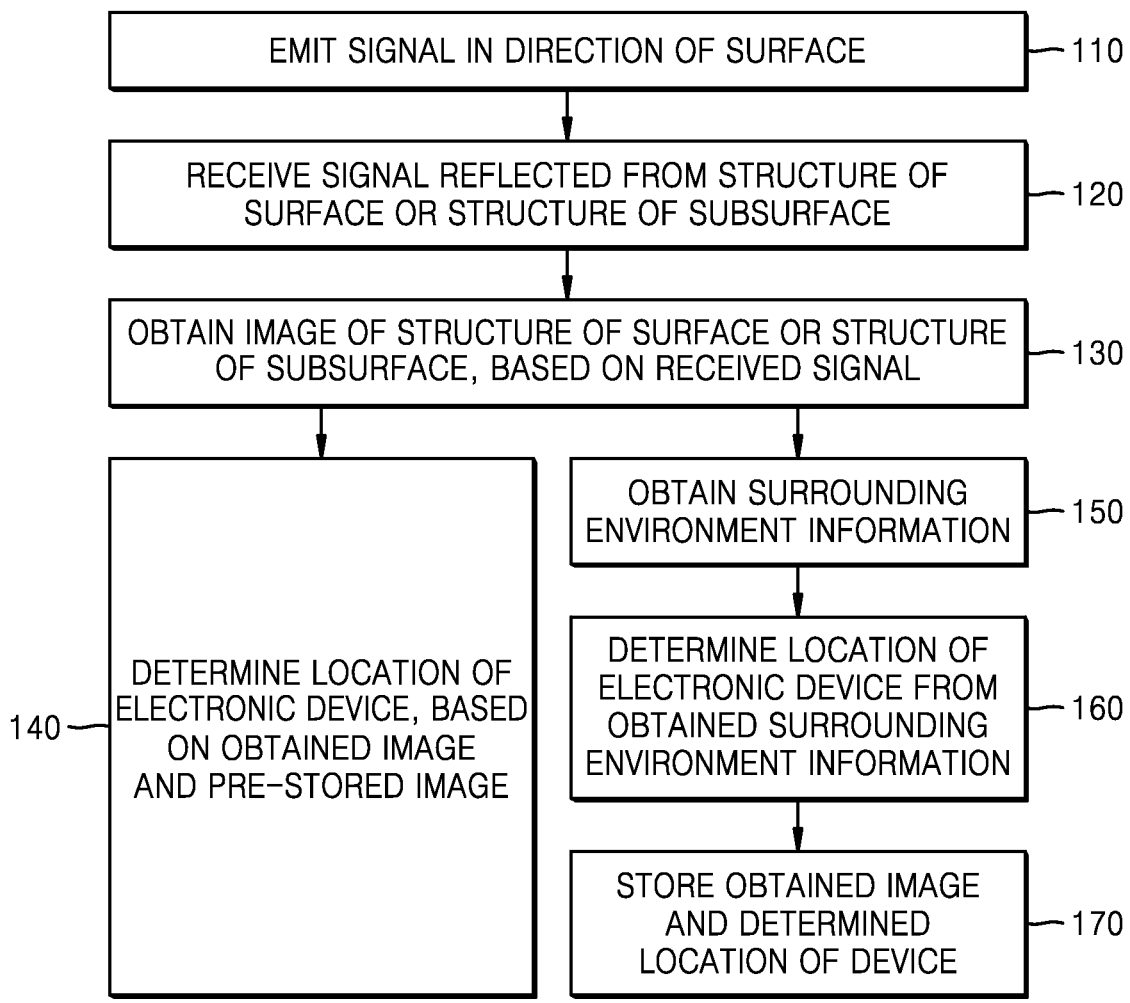
FIG. 1 is a flowchart of a method of determining a path of an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Throughout the disclosure, the expression "at least one of a, b or c" indicates only a, only b, only c, both a and b, both a and c, both b and c, all of a, b, and c, or variations thereof.

The disclosure provides a method of using at least one sensor to assist navigation of a moveable electronic device, such as a robot.

An electronic device according to an embodiment of the disclosure may include a first sensor for obtaining an image of a structure of a surface or an image of a structure of a subsurface, and at least one sensor for obtaining various types of data. According to an embodiment of the disclosure, the first sensor may include a ground-penetrating radar (GPR) sensor and the second sensor may include an active sensor for obtaining surrounding environment information of the electronic device. Hereinafter, for convenience of description, the first sensor may be referred to as a GPR sensor and the second sensor may be referred to as an active sensor, but the first and second sensors are not limited thereto. For example, a sensor capable of obtaining the image of the structure of surface or the image of the structure of subsurface may be unlimitedly applied as the first sensor and a sensor capable of obtaining the surrounding environment information of the electronic device may be unlimitedly applied as the second sensor.

An embodiment of the disclosure may be applied to any object moving on a surface, such as a ground or floor. According to an embodiment of the disclosure, a distance from a bottom of an object (or a radar antenna) moving on a surface to the surface where the object is moving may be equal to or smaller than several centimeters (cm). For example, the object may be a vehicle moving on a road. According to an embodiment of the disclosure, the quality of navigation may improve when the distance between the radar antenna and the surface where the object is moving is small. Also, the navigation may be further stabilized when the distance between the radar antenna and the surface does not change while the object moves. Accordingly, an embodiment of the disclosure may be suitable for an electronic device moving indoors, such as a robot vacuum cleaner.

For example, when a moveable electronic device, such as a robot vacuum cleaner, operates in a bad environment condition (for example, a dark space or a wide area), a GPR sensor may be additionally used to compensate for drawbacks of an active sensor, such as a light detection and ranging (LIDAR) sensor or a camera. By using the GPR sensor according to an embodiment of the disclosure, an image of a structure of a subsurface of a surface where an electronic device is moving may be obtained. A signal such as electromagnetic waves may penetrate the surface where the electronic device is moving and may be reflected from various structures of surface or subsurface.

According to an embodiment of the disclosure, the GPR sensor using pulse type electromagnetic waves having a frequency of up to 10 GHz may be used. The higher an operating frequency of the GPR sensor, the less likely radiation penetrate structures of subsurface. For example, the electromagnetic waves penetrating the surface where the electronic device is moving may be reflected from structural elements of the surface or from heterogeneity (structure below the surface) including communication lines such as wiring and piping present in the subsurface. Accordingly, a map of structural features of the surface or a map of the structure of the subsurface may be generated by using the GPR sensor and orientation of the electronic device may be assigned by using the generated maps (for example, to find a location). Data obtained from the GPR sensor according to an embodiment of the disclosure may be effectively added to data of other active sensors of the electronic device or replace data of other sensors, and accordingly, may effectively assist real-time navigation of the electronic device.

The electronic device may avoid a collision with a wall, chair, or another object on the surface while moving, by using the active sensors such as a LIDAR sensor or a camera.

The electronic device according to an embodiment of the disclosure may detect an object with a low profile (an object having a low height), such as spilt fluid, by using the GPR sensor. Accordingly, the electronic device may identify the structural features of the surface where the electronic device is moving and the structure of the subsurface. According to an embodiment of the disclosure, efficiency and sensitivity of the GPR sensor may be improved, an overall size of the GPR sensor may be reduced, and navigation efficiency of the electronic device including the GPR sensor may be increased.

FIG. 1 is a flowchart of a method of determining a path of an electronic device, according to an embodiment of the disclosure.

Referring to FIG. 1, in operation 110, when the electronic device starts to move, a signal may be emitted in a direction of a surface where the electronic device is moving. For example, the electronic device may emit or radiate the signal in the direction of the surface by using a first sensor. The signal may include, for example, electromagnetic radiation in a form of a radio frequency signal. According to an embodiment of the disclosure, when the electronic device including a ground-penetrating radar (GPR) sensor (or a surface-penetrating radar (SPR) sensor) at a bottom surface thereof moves along the surface in a mode of compiling a map of the structure of the surface or a map of a structure of a subsurface, an antenna may emit electromagnetic radiation in a form of a radio frequency signal in the direction of the surface where the electronic device is moving.

In operation 120, a signal reflected from the structure of the surface or the structure of the subsurface may be received. The signal may include, for example, electromagnetic radiation. For example, the signal emitted in operation 110 may be reflected from the structure of the surface or the structure of the subsurface and the reflected signal may be received in operation 120.

In operation 130, an image of the structure of the surface or the structure of the subsurface may be obtained based on the received signal. For example, the image of the structure of surface or the structure of subsurface may include a radio image (GPR image or SPR image).

According to an embodiment of the disclosure, the reflected signal received in operation 120 may be received by the antenna and then reach a receiver of the GPR sensor, and an output signal of the receiver of the GPR sensor may be supplied to a micro-controller. In operation 130, a radiogram may be formed from received data. For example, an image of the surface may be completely formed when a plurality of signals are accumulated (the greater the number of signals, the more accurate the image of the surface, but only one signal may also be used).

According to an embodiment of the disclosure, the image of the structure of surface or the structure of subsurface may include a navigation map. The navigation map may be recorded in a memory (or a database) of the electronic device (or a robot). According to an embodiment of the disclosure, information about what features are present at what depth on the surface or below the surface may be obtained from the navigation map. The features may denote heterogeneities or objects (for example, wiring or piping). Coordinates of the features may be determined by using odometer, camera, or another active sensor included in the electronic device. The navigation amp that is compiled may be used for navigation of the electronic device moving on the surface of which the navigation map is obtained. Unique navigation maps may be present respectively for different surfaces.

In operation 140, a location of the electronic device may be determined based on the obtained image and an image pre-stored in the electronic device. According to an embodiment of the disclosure, when it is possible to determine the location of the electronic device, based on the obtained image and the image pre-stored in the electronic device, the location of the electronic device may be determined based on the obtained image and the pre-stored image. For example, when the electronic device moves during an operation mode, the first sensor, such as a GPR sensor (or a GPR scanner), may obtain a current radiogram of the structure of surface or the structure of subsurface (operation 130), and compare the obtained radiogram with a pre-stored radiogram. For example, when it is determined that there is a correlation between the image obtained by the first sensor and an image pre-stored in a database, the location of the electronic device may be determined based on location information (coordinates) of the image pre-stored in the database.

According to an embodiment of the disclosure, when the obtained image and the image pre-stored in the electronic device match each other, i.e., when it is determined that the obtained image matches a part of a map pre-stored in the electronic device, the location of the electronic device may be determined based on location information of a corresponding part. The coordinates known from the database enables the location of the electronic device to be determined in real-time from a coordinate system of the surface where the electronic device is moving.

According to an embodiment of the disclosure, when the GPR sensor obtains a radiogram at a certain place at a certain time, information indicating that the obtained radiogram corresponds to pre-known location information (coordinates) may be received from the database of the electronic device. When the GPR sensor does not receive the radiogram, information indicating that a radiogram corresponding to the pre-known coordinates is not obtained from a corresponding place may be received from the database.

In operation 150, the electronic device may obtain surrounding environment information. According to an embodiment of the disclosure, when it is impossible to determine the location of the electronic device based on the obtained image and the image pre-stored in the electronic device, the surrounding environment information of the electronic device may be obtained by using a second sensor, such as an active sensor. For example, when the location of the electronic device is unable to be determined based on the image obtained from the GPR sensor and the pre-stored image, data may be obtained from another active sensor to determine the location of the electronic device.

In operation 160, the location of the electronic device may be determined from the obtained surrounding environment information. For example, when it is possible to determine the location of the electronic device from the obtained surrounding environment information, the location of the electronic device may be determined from the data obtained by the second sensor, such as an active sensor.

In operation 170, the obtained image and the determined location of the electronic device may be stored. According to an embodiment of the disclosure, the electronic device may store the obtained image and the determined location of the electronic device in response to the determining of the location of the electronic device from the obtained surrounding environment information. For example, the electronic device may update the database by storing the determined location of the electronic device in the database.

According to an embodiment of the disclosure, when it is impossible to determine the location of the electronic device based on the image obtained by the first sensor, such as a GPR sensor, and the image pre-stored in the electronic device, and when it is impossible to determine the location of the electronic device based on the obtained data of the second sensor, such as an active sensor, the method may further include outputting information indicating a loss of orientation of the electronic device.

Figure 2:
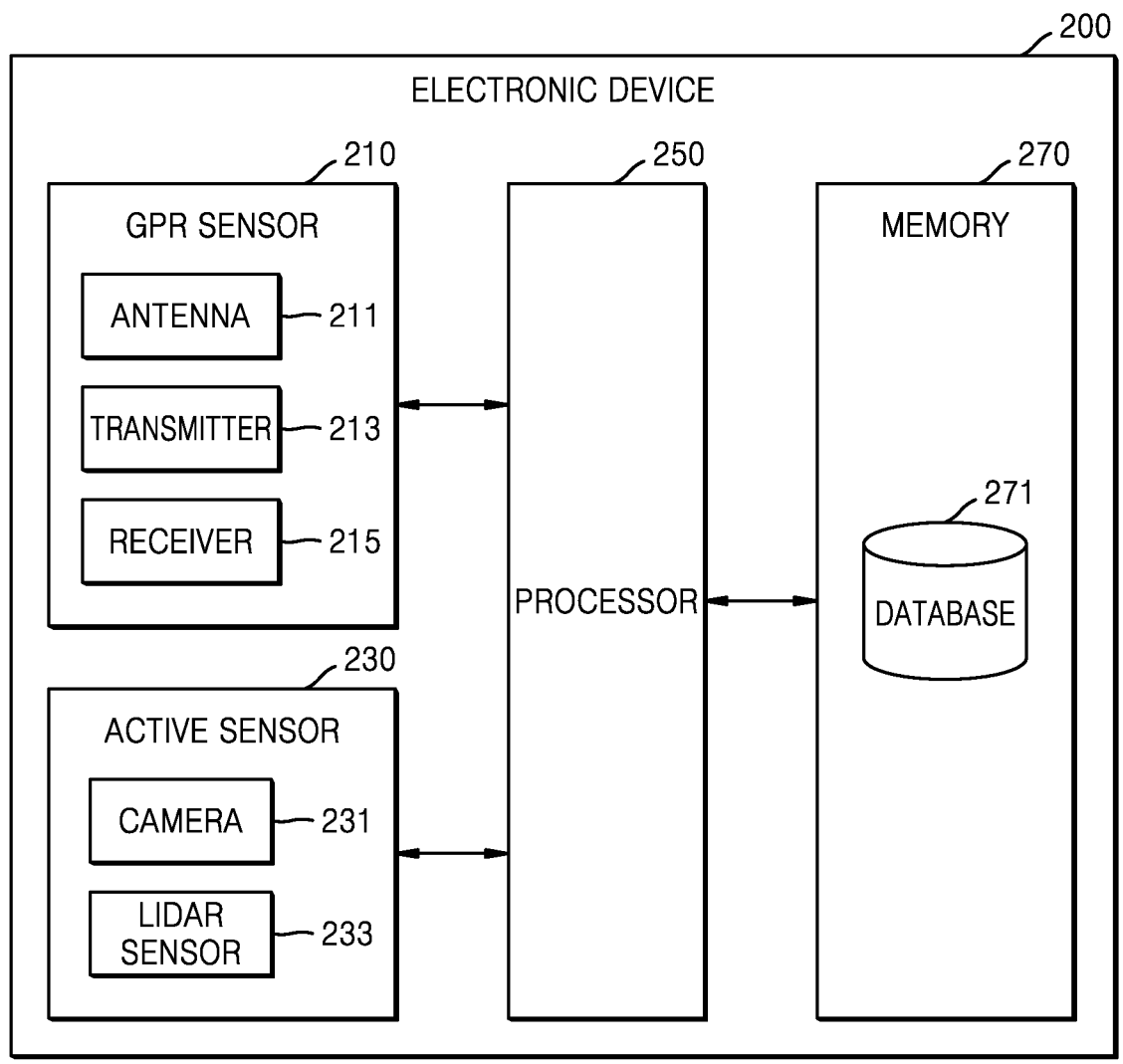
FIG. 2 is a block diagram of an electronic device according to an embodiment of the disclosure.

FIG. 2 is a block diagram of an electronic device according to an embodiment of the disclosure.

Referring to FIG. 2, an electronic device 200 may include a GPR sensor 210, an active sensor 230, a processor 250, and a memory 270. Not all components shown in FIG. 2 are essential components of the electronic device 200. The electronic device 200 may include more or fewer components than those shown in FIG. 2.

The GPR sensor 210 may identify structural features of a surface or a structure of a subsurface where the electronic device 200 is moving, and obtain an image of a structure of the surface or an image of the structure of the subsurface. According to an embodiment of the disclosure, the GPR sensor 210 (or a GPR) may include a georadar or a SPR sensor (or SPR). A main characteristic of the GPR is that the GPR may operate even on a surface of a high dielectric constant (for example, soil with high moisture content). On the other hand, the SPR may operate on a surface with a low dielectric constant. The disclosure may be applied not only to the GPR, but also any type of SPR.

Another feature of the GPR sensor 210 according to an embodiment of the disclosure may be that the GPR sensor 210 is able to detect a structure of a floor surface or a structure of a subsurface where the electronic device 200 is moving. According to an embodiment of the disclosure, the structure of the surface may denote a volume structure of the floor surface where the electronic device 200 including the GPR sensor 210 is moving. For example, the GPR sensor 210 may obtain data about a dielectric constant of the volume at a certain depth and detect characteristics of the surface (for example, a tile, linoleum, parquet, or laminate), based on the obtained data. Also, the GPR sensor 210 may determine the location of the electronic device 200 by comparing the obtained data with a pre-set database, thereby simplifying navigation of the electronic device 200 in a space.

According to an embodiment of the disclosure, the GPR sensor 210 may include an antenna 211, a transmitter 213, and a receiver 215. According to an embodiment of the disclosure, the GPR sensor 210 may further include a micro-controller. According to an embodiment of the disclosure, the transmitter 213 and the receiver 215 may be located directly on the antenna 211. In other words, the transmitter 213 and the receiver 215 may be arranged to contact the antenna 211. Such a structure of the GPR sensor 210 may enable a distance between the antenna 211 and the transmitter 213 or receiver 215 of the GPR sensor 210 to be reduced and prevent interference such as parasitic reflection caused by wiring.

According to an embodiment of the disclosure, the antenna 211 of the GPR sensor 210 may include an ultra-wideband (UWB) microwave antenna. For example, the antenna 211 may include a conductive current redistribution layer and a transceiver layer including at least two arms. According to an embodiment of the disclosure, the two arms may be symmetrical.

The active sensor 230 may obtain data including location information of the electronic device 200 via any one of various methods. For example, the active sensor 230 may include all types of sensor, such as a camera 231, a LIDAR sensor 233, an ultrasonic sensor, an optical sensor, an inertial measurement unit (IMU), and an odometer. According to an embodiment of the disclosure, when the active sensor 230 includes the camera 231, the electronic device 200 may obtain location information of the electronic device 200 in a space from a visual image of a surrounding environment.

The memory 270 may store a program to be executed by the processor 250 described below to control operations of the electronic device 200. The memory 270 may include a program including at least one instruction for controlling the operations of the electronic device 200. The memory 270 may store instructions and program codes, which may be read by the processor 250. According to an embodiment of the disclosure, the processor 250 may be implemented to execute the instructions or codes of the program stored in the memory 270. The memory 270 may store data input to or output from the electronic device 200.

For example, the memory 270 may include at least one type of storage medium among a flash memory, a hard disk, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The programs stored in the memory 270 may be classified into a plurality of modules depending on functions. For example, the memory 270 may include a database (DB) 271. The DB 271 may store an image of a structure of a surface or a structure of a subsurface, and location information corresponding to the image. The image of the structure of surface or subsurface may be pre-stored or obtained by the GPR sensor 210. The location information may include coordinates on a space. The location information may correspond to the image. The DB 271 may be stored in software of the electronic device 200 or in a data cloud communicating via Wi-Fi.

The processor 250 may control overall operations of the electronic device 200. For example, the processor 250 may execute the programs stored in the memory 270 to control the GPR sensor 210, the active sensor 230, and the memory 270 in general.

The processor 250 may include a hardware component performing arithmetic operations, logic operations, input/output operations, and signal processing. The processor 250 may include, for example, at least one of a central processing unit (CPU), a micro-processor, a graphics processing unit (GPU), an application specific integrated circuit (ASIC), a digital signal processor (DSP), a digital signal processing device (DSPD), a programmable logic device (PLD), or a field programmable gate array (FPGA), but is not limited thereto.

The processor 250 may execute the at least one instruction stored in the memory 270 to control the GPR sensor 210 to emit a signal, such as electromagnetic radiation in a form of a radio frequency signal, in a direction of the surface, receive a signal reflected from the structure of the surface or subsurface, and obtain the image of the structure of the surface or subsurface based on the received signal. The processor 250 may execute the at least one instruction stored in the memory 270 to determine a location of the electronic device 200 when it is possible to determine the location of the electronic device 200 based on the obtained image and an image pre-stored in the memory 270. The processor 250 may execute the at least one instruction stored in the memory 270 to obtain data by controlling at least one active sensor 230 when it is impossible to determine the location of the electronic device 200 based on the obtained image and the image pre-stored in the memory 270, and when it is possible to determine the location of the electronic device 200 from the obtained data, determine the location of the electronic device 200 and update the DB 271 by storing the obtained image and the determined location of the electronic device 200 in the memory 270.

Figure 3:
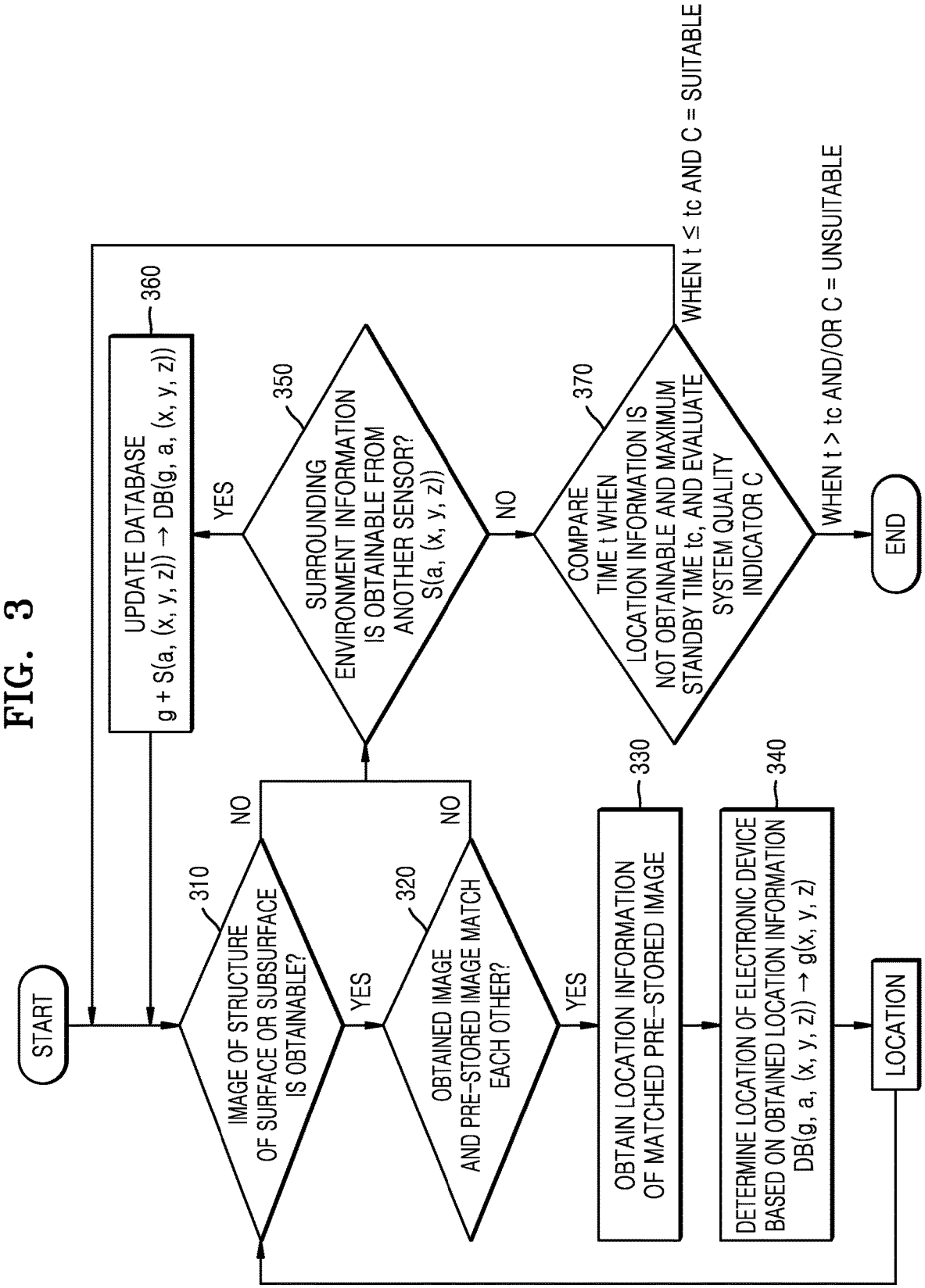
FIG. 3 is a flowchart of a method of determining a path of an electronic device according to an embodiment of the disclosure.

FIG. 3 is a flowchart of a method of determining a path of an electronic device according to an embodiment of the disclosure.

Referring to FIG. 3, a first sensor may denote a GPR sensor or an SPR sensor, and the electronic device may include a vehicle or a robot.

The following notations may be used. (x, y, z) may denote coordinates of a location of the electronic device. g may denote an image (radiogram) from the first sensor, such as a GPR sensor. $t_c$ denotes a maximum standby time for receiving an image or coordinates of the electronic device. C is a critical parameter of a system and may denote a quality indicator of system performance (for example, a battery charge level of the electronic device). t denotes a standby time. S(a, (x, y, z)) may denote coordinates obtained from an active sensor (i.e., a second sensor) other than the GPR sensor. DB(g, a, (x, y, z)) denotes a DB that is dynamically generated. g(x, y, z) denotes coordinates of a current location of the electronic device.

In operation 310, it may be determined whether an image of a structure of surface or subsurface is obtainable. For example, it may be determined whether the first sensor of the electronic device is able to obtain an image in a subsurface region along track (i.e., path) of a vehicle.

In operation 320, it may be determined whether the obtained image and a pre-stored image match each other. According to an embodiment of the disclosure, it may be determined whether the obtained image and the image pre-stored in the electronic device, i.e., the obtained image and a part of a map pre-stored in the electronic device match each other. For example, only when the first sensor is able to obtain the image, the electronic device may compare the obtained image and the image g pre-stored in a DB.

In operation 330, location information may be obtained from the matched pre-stored image. For example, when it is determined that the obtained image matches the part of the map pre-stored in the electronic device, location information corresponding to the obtained image may be obtained from a corresponding part.

In operation 340, a location of the electronic device may be determined based on the obtained location information. For example, when it is determined that the obtained image and the image g pre-stored in the DB has a correlation (i.e., sameness), the coordinates g(x, y, z) of the current location of the electronic device may be determined based on location information obtained from the image g pre-stored in the DB, for example, based on the coordinates (x, y, z). In other words, the electronic device may determine its current location. When the electronic device moves, operations 310 through 340 may be performed again to determine the location of the electronic device again.

In operation 350, it may be determined whether surrounding environment information is obtainable from another sensor. For example, when it is determined that the image is not obtainable from the GPR sensor (i.e., the first sensor) or that the image obtained by the GPR sensor (i.e., the first sensor) and the image pre-stored in the DB do not match each other, it may be determined whether another active sensor (i.e., the second sensor) of the electronic device is able to obtain the surrounding environment information. A case in which the image of the structure of surface or subsurface is not obtainable along the path of the electronic device may be, for example, a case in which the first sensor, such as an SPR sensor or a GPR sensor, did not receive any image or a case in which only noise less than a pre-set threshold value is obtained.

For example, when the structure of surface does not allow an image to be formed, such as a metal floor or a completely homogeneous floor, the image may not be obtained by the GPR sensor (i.e., the first sensor). When the structure of a surface does not allow an image to be formed, an electromagnetic wave signal may look like noise (for example, a radiogram is configured via a maximum value and a minimum value of a signal, but when a surface is flat, the maximum value and the minimum value of the signal are not distinguished from noise), and thus the image may not be formed.

As such, when the GPR sensor (i.e., the first sensor) is unable to obtain an image and there is no correlation (i.e., sameness) between the image obtained by the GPR sensor (i.e., the first sensor) and the image pre-stored in the DB of the electronic device, it may be determined whether the other active sensor (i.e., the second sensor) of the electronic device is able to obtain the data including the surrounding environment information, in operation 350. When the image is not obtained or when it is determined that there is no correlation between the obtained image and the image pre-stored in the DB, a processor may request the other active sensor (i.e., the second sensor) for the corresponding coordinates S(a, (x, y, z)).

Because the other active sensor (i.e., the second sensor) of the electronic device is able to obtain location information of the electronic device via any one of various methods, the electronic device may use location information (i.e., coordinates) stored in the DB and location data (i.e., coordinates) obtained by the active sensor (the second sensor) for a navigation operation.

In operation 360, when the other active sensor (i.e., the second sensor) of the electronic device is able to obtain data of the current location of the electronic device, the processor may update the DB by adding the location data received from the other active sensor (i.e., the second sensor) and the image of the structure of surface or subsurface obtained by the GPR sensor to the DB: g+S(a, (x,y,z))→DB(g, a, (x,y,z)). Accordingly, the DB may be continuously updated and a path search of the electronic device may be further efficiently and accurately performed in real-time.

In operation 370, when even the other active sensor (i.e., the second sensor) of the electronic device is unable to obtain the location information of the electronic device, the electronic device may compare a time t when the location information is unable to be obtained and a maximum standby time tc and evaluate the quality indicator C.

According to an embodiment of the disclosure, when the time t when the location information of the electronic device is unable to be obtained exceeds the maximum standby time tc (t>tc) or when an evaluation result of the quality indicator C (for example, a battery charge amount) of a system operation is 'unsuitable (C=unsuitable), the electronic device may stop from moving or operating, and wait for an indication signal from a user or output information indicating a 'loss of orientation' via light or sound.

According to an embodiment of the disclosure, when the time t when the location information of the electronic device is unable to be obtained does not exceed the maximum standby time tc (t≤tc) or when the evaluation result of the quality indicator C of the system operation is 'suitable' (C=suitable), the electronic device may continuously move or operate and the GPR sensor (i.e., the first sensor) may scan the structure of surface or subsurface where the electronic device is moving.

According to an embodiment of the disclosure, when the GPR sensor (i.e., the first sensor) is unable to obtain the image of the structure of surface or subsurface according to movement of the electronic device or when an image with a signal-to-noise radio (SNR) equal to or lower than a threshold value is received, the GPR sensor (i.e., the first sensor) may request data on coordinates identified by the other active sensor (i.e., the second sensor) of the electronic device. The threshold value may vary and may be determined by an average value of signal noise. When the location information (i.e., coordinates) of the electronic device is obtained from the other active sensor (i.e., the second sensor) of the electronic device, the processor may store the location information in the DB and update the DB. While performing an additional operation, the electronic device may continuously move and the GPR sensor (i.e., the first sensor) may use the DB updated after the operation.

Because the GPR sensor or SPR sensor examines the structure of surface or subsurface, a distance from the GPR sensor or SPR sensor to the surface may be determined by a height of the electronic device (i.e., robot). Another active sensor, such as a LIDAR sensor or camera, included in the electronic device may analyze a peripheral space of the electronic device, but an operation range of the LIDAR sensor may be restricted and the camera may not operate properly in a dark place. The electronic device including the GPR sensor according to an embodiment of the disclosure may unlimitedly operate, for example, even in a room without lighting (i.e., when a camera is not usable), in a room with a mirror (i.e., when operation of a LIDAR sensor is restricted), or in a space where the electronic device is located is very large. In other words, when the other active sensor is not usable, the GPR sensor may be used for navigation by analyzing the structure of surface or subsurface by using a radio signal.

Figure 4:
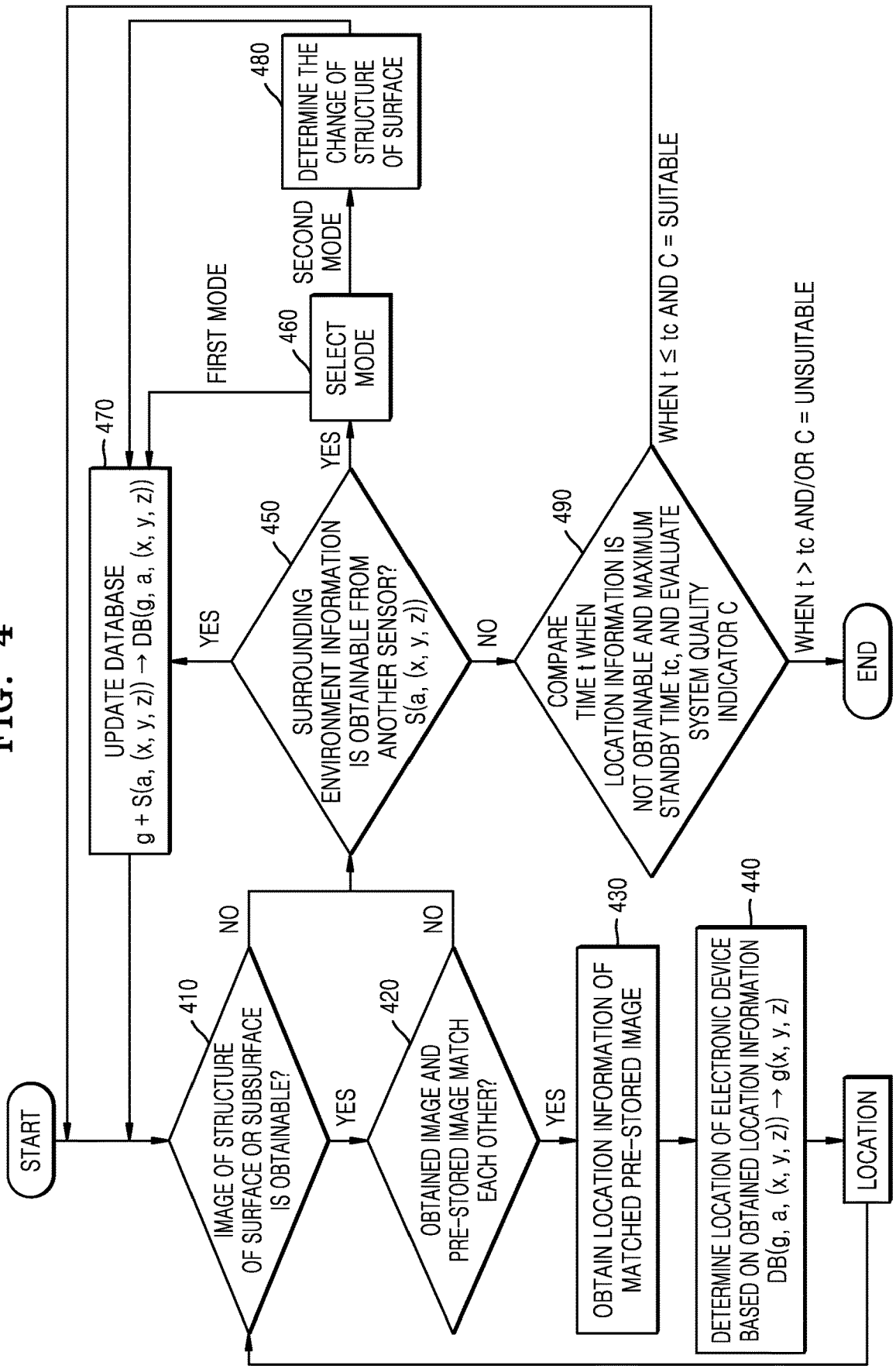
FIG. 4 is a flowchart of a method of determining a path of an electronic device according to another embodiment of the disclosure.

FIG. 4 is a flowchart of a method of determining a path of an electronic device according to another embodiment of the disclosure.

Referring to FIG. 4, an alternative method of determining a path of an electronic device, according to an embodiment of the disclosure is shown. Such a method may aim at detecting an object with a low profile, such as fluid spilt on a surface where the electronic device is moving.

Operations 410, 420, 430, 440, 450, and 490 of FIG. 4 may be performed in the similar manner as operations 310, 320, 330, 340, 350, and 370 of FIG. 3, respectively.

First, in operation 450, when it is determined that a first sensor (i.e., a GPR sensor or an SPR sensor) is unable to obtain an image or that there is no correlation (sameness) between an image obtained by the first sensor and an image pre-stored in a DB, it may be determined whether a second sensor (i.e., another active sensor) of the electronic device is able to obtain data including surrounding environment information. The image is not obtained by the GPR sensor (i.e., the first sensor) when, for example, it is impossible to form an image of a surface because a signal and noise are not distinguished from each other due to a structure of a floor surface (i.e., a metal surface or a completely homogeneous floor) or when there is no correlation between the image received by the GPR sensor (i.e., the first sensor) or the image obtained from the DB of the electronic device. In this case, the electronic device may request the other active sensor (i.e., the second sensor) included in the electronic device for data, such as location information (i.e., coordinates). No correlation between the image received by the GPR sensor (i.e., the first sensor) and the image obtained from the DB may indicate that, for example, a correlation (i.e., sameness) is broken because an image of a structure of a surface pre-stored in the DB and an obtained image are different from each other, such as when spilt fluid that was not present on a floor image suddenly appears.

Main differences between the method of FIG. 4 and the method of FIG. 3 are as follows.

When the electronic device requests the other active sensor (i.e., the second sensor) for necessary data, one of two modes below may be selected in operation 460.

First Mode (Operation 470): When the other active sensor (i.e., the second sensor) of the electronic device is able to obtain location information (i.e., coordinates) of the electronic device at a corresponding time and there is no pre-stored image or coordinates for a given section of a corresponding path in the DB, the DB is updated by adding, to the DB, data (i.e., coordinates) obtained from the other active sensor (i.e., the second sensor).

Second Mode (Operation 480): When the other active sensor (i.e., the second sensor) of the electronic device is able to obtain the location information (i.e., coordinates) of the electronic device at the corresponding time, the pre-stored image and coordinates for the given section of the corresponding path are present in the DB, and the correlation (i.e., sameness) between the obtained image and the image obtained from the DB disappears because the obtained image is changed to be different from the pre-stored image as the electronic device passes the corresponding section, it is determined that a structure of a surface of the corresponding path is changed.

According to an embodiment of the disclosure, when operation 480 is performed as the second mode is selected, the electronic device may further update the DB by changing a pre-stored image corresponding to a determined location of the electronic device to a newly obtained image.

According to an embodiment of the disclosure, the electronic device may be a robotic cleaner. For example, when the second mode is selected and operation 480 is performed, a "contamination removal" command for removing contamination may be provided to the electronic device configured as the robotic cleaner. Thereafter, when the contamination is removed and thus it is determined that an image of a certain section of a path correlate to an image pre-stored in the DB again, executing of the "contamination removal" command may be ended and the electronic device may continuously move.

FIGS. 5A through 5D are diagrams of an electronic device including a GPR sensor, according to various embodiments of the disclosure.

Figure 5A:
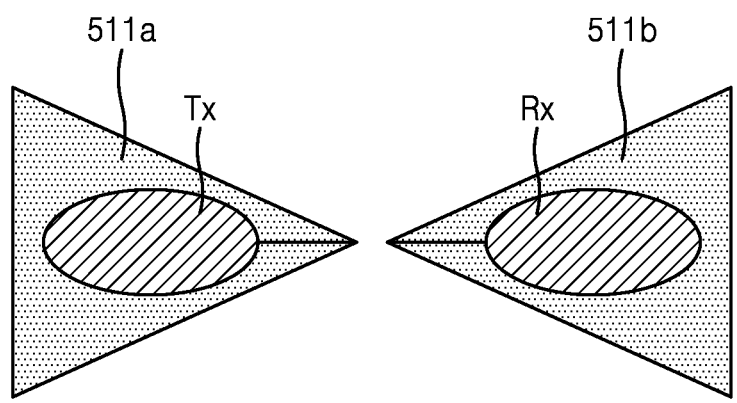
FIG. 5A is a diagram of a transceiver layer of an antenna according to an embodiment of the disclosure.
Figure 5B:
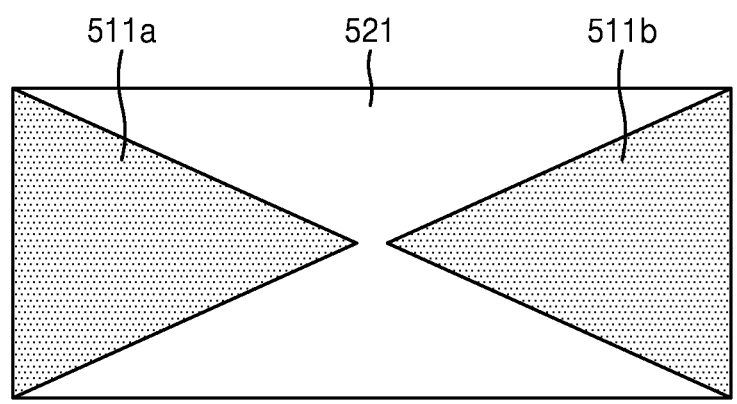
FIG. 5B is a diagram of an antenna according to an embodiment of the disclosure.

FIG. 5A illustrates a bottom surface of a transceiver layer of an antenna and FIG. 5B illustrates the transceiver layer arranged on a current redistribution layer of the antenna.

Referring to FIG. 5A, the transceiver layer of the antenna may be a butterfly type. According to an embodiment of the disclosure, the antenna may be manufactured via a printing technology.

Referring to FIG. 5B, for example, the transceiver layer may have a butterfly shape including two arms 511a and 511b in a symmetric triangular form and a current redistribution layer 521 may have a rectangular shape. A receiving path of the antenna may be located on a horizontal line of the transceiver layer of the antenna. One end of the receiving path may be located close to a center of the antenna on one of the two arms 511a and 511b of the transceiver layer. The other end of the receiving path may be connected to a transmitter Tx or a receiver Rx via a key to alternately transmit or receive a signal.

The transmitter Tx and the receiver Rx may be located to physically and directly contact the transceiver layer, thereby reducing the size of a GPR sensor included in the electronic device and preventing interference of noise caused by parasitic reflection in wiring.

Referring to FIG. 5A, the transmitter Tx and the receiver Rx of the GPR sensor may be located to physically and directly contact the bottom surface of the two symmetric arms 511a and 511b of the antenna. According to an embodiment of the disclosure, the two arms 511a and 511b of the antenna may each be configured to switch between a transmission state and a reception state.

Figure 8:
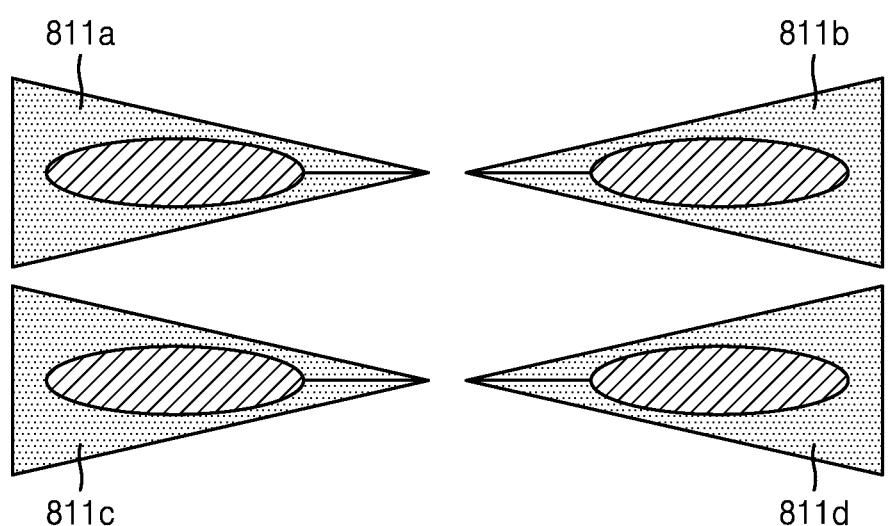
FIG. 8 is a diagram for describing a GPR sensor including a plurality of antennas, according to an embodiment of the disclosure.

Referring to FIGS. 5A and 5B, according to an embodiment of the disclosure, the two arms 511a and 511b of the antenna may be configured in two symmetric triangles having a receiving path at the center. For example, the transmitter Tx and the receiver Rx of the GPR sensor may be arranged on the current redistribution layer 521. For example, referring to FIG. 5B, the transmitter Tx and the receiver Rx of the GPR sensor may be arranged between the current redistribution layer 521 and one of the two arms 511a and 511b of the transceiver layer. In other words, the transmitter Tx of FIG. 5A may be arranged on the current redistribution layer 521 below the left arm 511a of the transmitter Tx switched to the transmission state. Also, the receiver Rx may be arranged on the current redistribution layer 521 below the right arm 511b of the transceiver layer switched to the reception state. Referring to FIG. 8 described below, because arms of a transceiver layer of an antenna, which are symmetric, may each be freely switched between the transmission state and the reception state, the transmitter Tx and the receiver Rx may be combined and arranged in any manner.

Figure 5C:
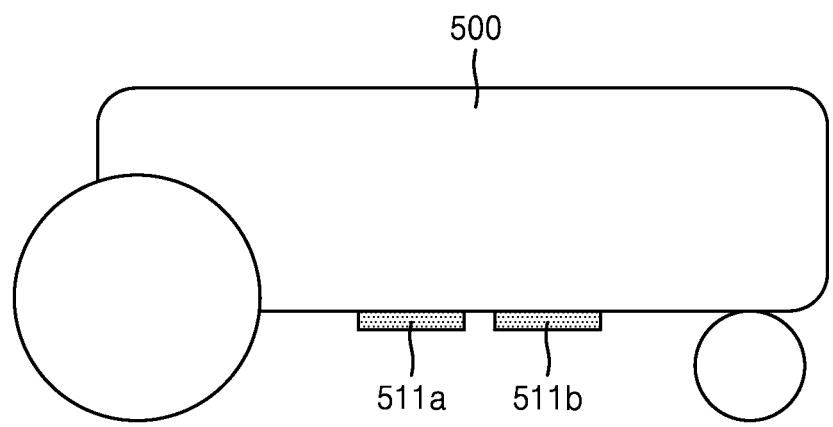
FIG. 5C is a diagram of an electronic device including a ground-penetrating radar (GPR) sensor, according to an embodiment of the disclosure.
Figure 5D:
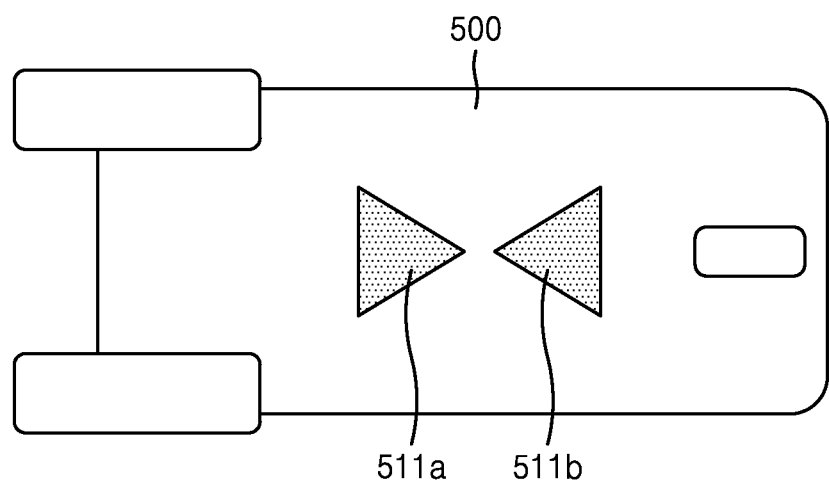
FIG. 5D is a diagram of an electronic device including a ground-penetrating radar (GPR) sensor, according to an embodiment of the disclosure.
Figure 6A:
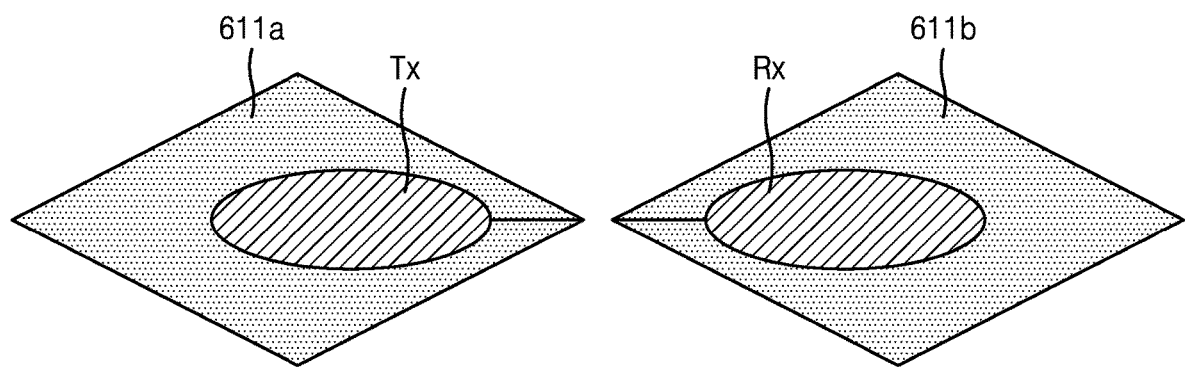
FIG. 6A is a diagram of a transceiver layer of an antenna according to an embodiment of the disclosure.
Figure 6B:
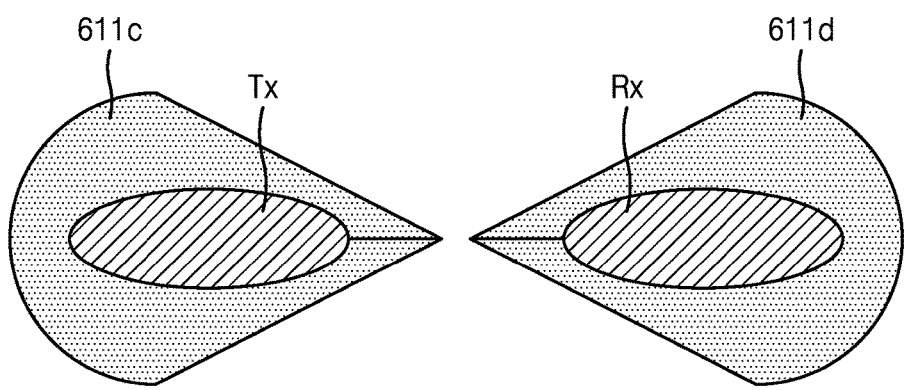
FIG. 6B is a diagram of a transceiver layer of an antenna according to another embodiment of the disclosure.
Figure 6C:
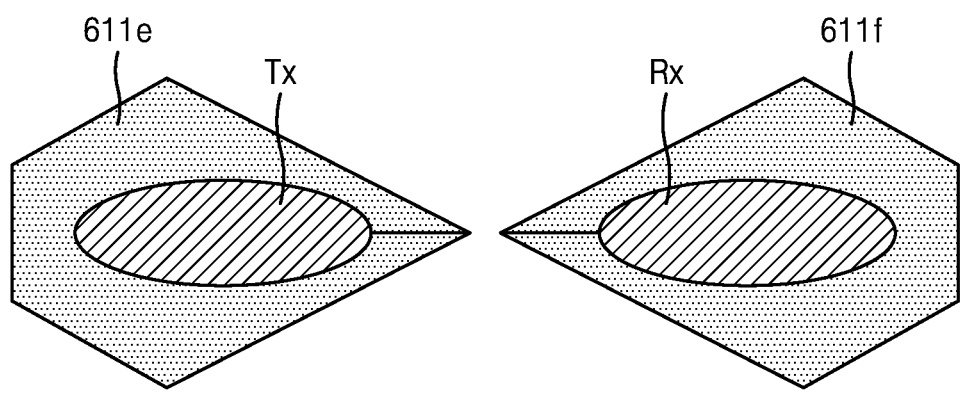
FIG. 6C is a diagram of a transceiver layer of an antenna according to another embodiment of the disclosure.
Figure 6D:
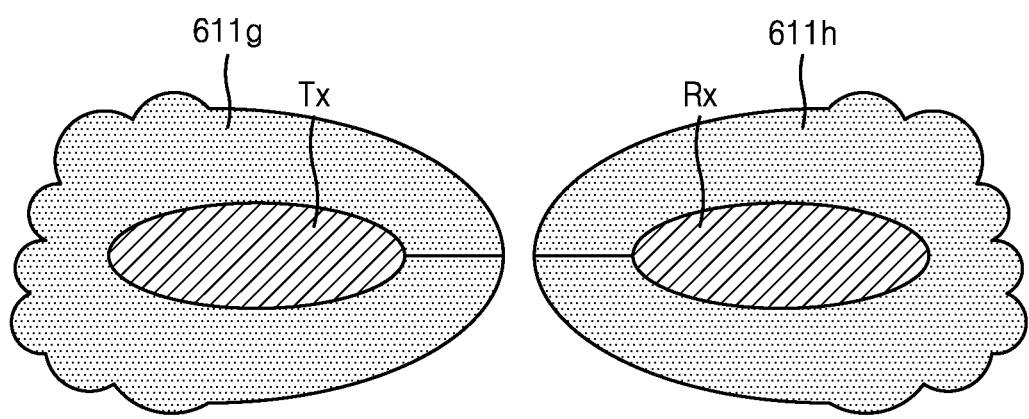
FIG. 6D is a diagram of a transceiver layer of an antenna according to another embodiment of the disclosure.

Referring to FIGS. 5C and 5D, the GPR sensor may be attached to a bottom surface of an electronic device 500, such as a robot. Accordingly, the transceiver layer of the antenna where the transmitter Tx and the receiver Rx of the GPR sensor are located may face a surface where the electronic device 500 is moving.

The transmitter Tx and the receiver Rx are directly arranged on the antenna and thus the GPR sensor of the disclosure may become compact. Accordingly, for example, using the GPR sensor in the electronic device 500, such as a robot vacuum cleaner, may bring great advantages. In addition, the arms 511a and 511b of the transceiver layer of the antenna may be independently switched between the reception state and the transmission state, and the transmitter Tx may be located at an antenna arm in the transmission state and the receiver Rx may be located at an antenna arm in the reception state. Accordingly, a signal matching characteristic and a signal-to-noise ratio (SNR) may be improved compared to a general GPR or SPR with long wiring.

Referring to FIG. 5C, a side surface of the electronic device 500 is illustrated.

Referring to FIG. 5D, a lower surface of the electronic device 500 is illustrated. According to an embodiment of the disclosure, the GPR sensor may be arranged on the bottom surface of the electronic device 500 to face the surface of the floor where the electronic device 500 is moving.

According to an embodiment of the disclosure, the GPR sensor may include: at least one antenna; at least one transmitter; and at least one receiver. For example, when the GPR sensor includes a plurality of transmitters and a plurality of receivers, the pluralities of transmitters and receivers may be arranged on the antenna in an arbitrary array. According to an embodiment of the disclosure, an antenna array may be used as an UWB antenna. When the transmitter and the receiver are directly located at the antenna, necessity of a transmission line, a power line, or a matching circuit may be removed. Also, an overall size of the GPR sensor may be significantly reduced and accordingly, the GPR sensor may be easily applied to a small electronic device, such as a home robot.

FIGS. 6A through 6D are diagrams of a transceiver layer of an antenna according to various embodiments of the disclosure.

Referring to FIGS. 6A through 6D, the transceiver layer of a butterfly type configuring an antenna topology may have various shapes. According to an embodiment of the disclosure, the antenna may include a transceiver layer including arms 611a and 611b having a diamond shape, a transceiver layer including aims 611c and 611d having a round shape at an outer region, a transceiver layer including arms 611e and 611f having a polygonal shape, or a transceiver layer including arms 611g and 611h having any shape. In FIGS. 6A through 6D, examples of an antenna having horizontal polarization are illustrated and according to an embodiment of the disclosure, the antenna may emit an electromagnetic field of which an electric field vector is horizontal to a surface where an electronic device is moving.

Figure 7A:
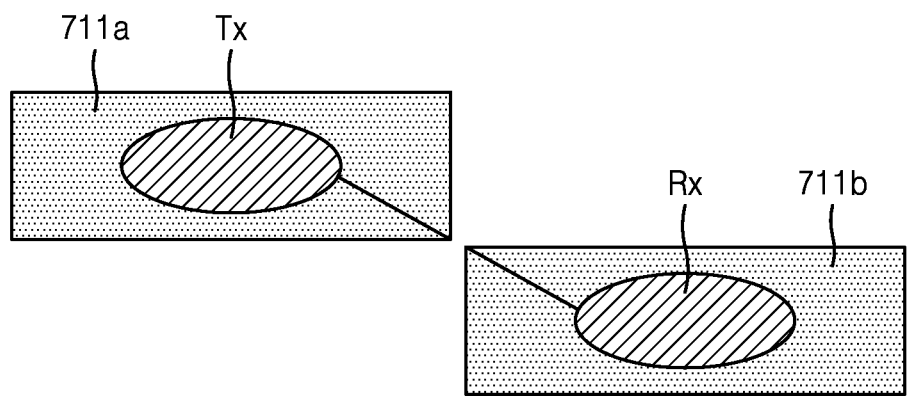
FIG. 7A is a diagram of a transceiver layer of an antenna according to an embodiment of the disclosure.

FIG. 7A illustrates a bottom surface of a transceiver layer of an antenna according to an embodiment of the disclosure.

Figure 7B:
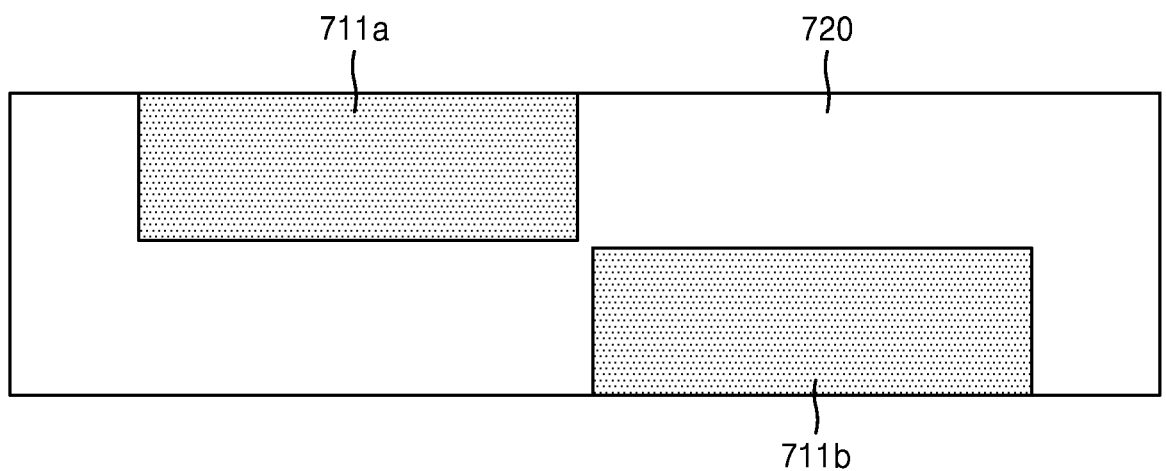
FIG. 7B is diagram of an antenna according to an embodiment of the disclosure.

FIG. 7B illustrates the transceiver layer arranged on a current redistribution layer of the antenna according to an embodiment of the disclosure.

Referring to FIGS. 7A and 7B, the antenna may include a transceiver layer including arms 711a and 711b of a chess type. According to an embodiment of the disclosure, when the antenna includes the transceiver layer, arranged on a current redistribution layer 720, including the arms 711a and 711*b* of the chess type, an emitted microwave signal may have perpendicular polarization. For example, the antenna may emit an electromagnetic field of which an electric field vector is perpendicular to a surface where an electronic device is moving.

A receiver Rx and a transmitter Tx may be located on different arms of the two arms 711*a* and 711*b* of the antenna or may be located on one of the two arms 711*a* and 711*b* of the antenna. For example, referring to FIGS. 6A through 7B, the transmitter Tx may be located on the left arm 611*a*, 611*c*, 611*e*, 611*g*, or 711*a* of the antenna and the receiver Rx may be located on the right arm 611*b*, 611*d*, 611*f*, 611*h*, or 711*b* of the antenna. On the other hand, according to an embodiment of the disclosure, the transmitter Tx and the receiver Rx may both be located on one of the two arms 711*a* and 711*b*.

According to an embodiment of the disclosure, a GPR sensor may include at least one receiver Rx and at least one transmitter Tx.

According to an embodiment of the disclosure, a pair of one of the at least one receiver Rx and one of the at least one transmitter Tx may be located on one of at least two arms, and a pair of another one of the at least one receiver Rx and another one of the at least one transmitter Tx may be located on another one of the at least two arms. In other words, a pair of the receiver Rx and transmitter Tx may be arranged on each of two arms of an antenna.

According to an embodiment of the disclosure, a pair of one of the at least one receiver Rx and one of the at least one transmitter Tx may be located on one of two arms of an antenna, and only the transmitter Tx or only the receiver Rx may be located on another one of the two arms of the antenna. In other words, both the transmitter Tx and the receiver Rx are arranged on one of the two arms of the antenna and only one of the transmitter Tx and the receiver Rx may be arranged on another one of the arms. The receiver Rx and the transmitter Tx may be arranged on an antenna in any other manner.

FIG. 8 is a diagram for describing a GPR sensor including a plurality of antennas, according to an embodiment of the disclosure.

Referring to FIG. 8, the GPR sensor may include a first antenna including a first transceiver layer including arms 811*a* and 811*b*, and a second antenna including a second transceiver layer including arms 811*c* and 811*d*. According to an embodiment of the disclosure, the GPR sensor may include two or more antennas. At least one receiver Rx and at least one transmitter Tx may have an arbitrary array and be directly arranged on each of the arms 811*a* through 811*d* of the first and second transceiver layers.

FIGS. 9A through 9D are diagrams of electronic devices including a GPR sensor, according to various embodiments of the disclosure.

Referring to FIGS. 9A through 9D, electronic devices 901 through 904 according to embodiments of the disclosure may include the GPR sensor. For example, the electronic devices 901 through 904 may be a robotic cleaner. According to an embodiment of the disclosure, the GPR sensor may be provided in the electronic devices 901 through 904 at a pre-set angle from a surface.

Figure 9A:
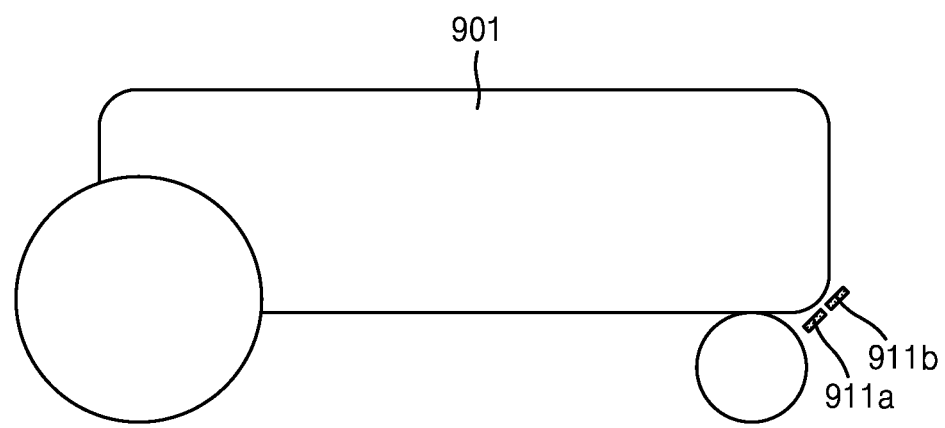
FIG. 9A is a diagram of an electronic device including a GPR sensor, according to an embodiment of the disclosure.

Referring to FIG. 9A, according to an embodiment of the disclosure, the GPR sensor including an antenna including two arms 911*a* and 911*b* may be located at a pre-set angle from a surface where the electronic device 901 is moving, on a front surface of the electronic device 901.

Figure 9B:
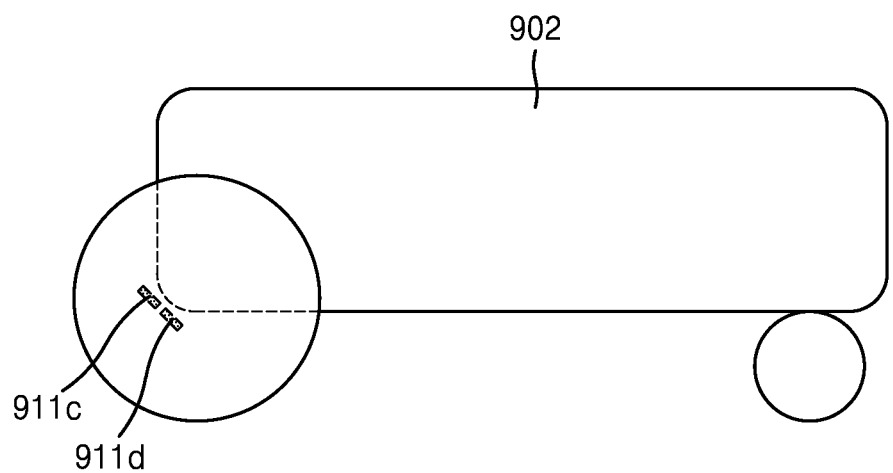
FIG. 9B is a diagram of an electronic device including a GPR sensor, according to another embodiment of the disclosure.

Referring to FIG. 9B, according to an embodiment of the disclosure, the GPR sensor including an antenna including two arms 911*c* and 911*d* may be located at a pre-set angle from a surface where the electronic device 902 is moving, on a rear surface of the electronic device 902.

Figure 9C:
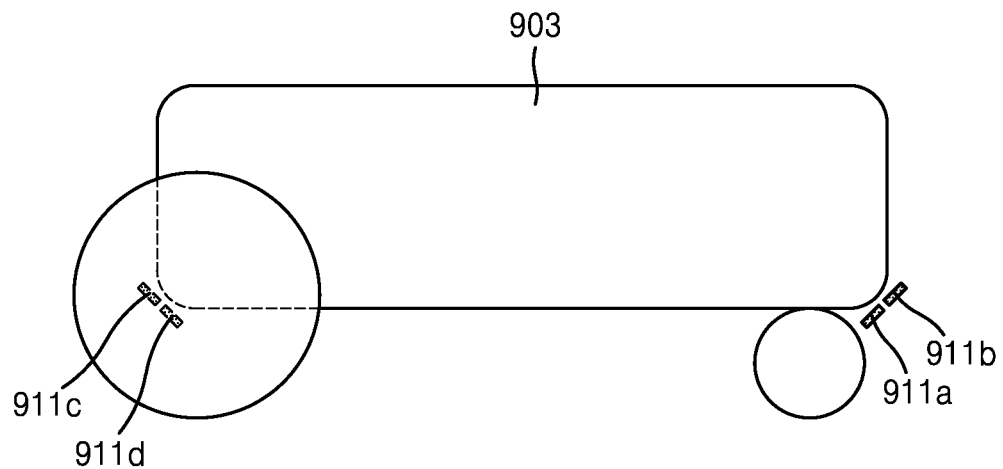
FIG. 9C is a diagram of an electronic device including a GPR sensor, according to another embodiment of the disclosure.

Referring to FIG. 9C, according to an embodiment of the disclosure, the electronic device 903 may include two or more GPR sensors. For example, the electronic device 903 may include a first GPR sensor including the antenna including the two arms 911*a* and 911*b* and a second GPR sensor including the antenna including two arms 911*c* and 911*d*. Referring to FIG. 9C, according to an embodiment of the disclosure, the first GPR sensor may be located at a pre-set angle from a surface where the electronic device 903 is moving on a front surface of the electronic device 903, and the second GPR sensor may be located at a pre-set angle from the surface where the electronic device 903 is moving on a rear surface of the electronic device 903.

Figure 9D:
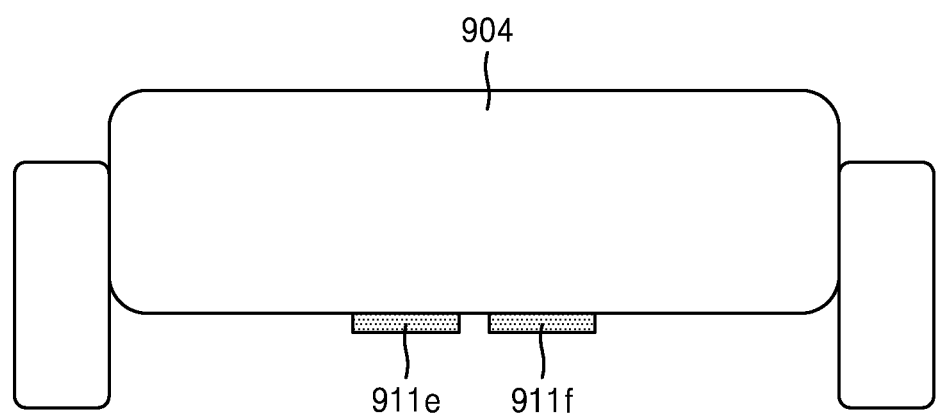
FIG. 9D is a diagram of an electronic device including a GPR sensor, according to another embodiment of the disclosure.

Referring to FIG. 9D, according to an embodiment of the disclosure, the electronic device 904 may include a GPR sensor including an antenna including two arms 911*e* and 911*f*. The GPR sensor may be located on a rear surface of the electronic device 904. The two arms 911*e* and 911*f* of the antenna may be arranged to face a direction perpendicular to a direction in which the electronic device 904 is moving.

When an electronic device including a sensor, such as a GPR sensor according to an embodiment of the disclosure, is used, additional navigation data, such as an image of a structure of a surface or subsurface may be obtained via the sensor such as the GPR sensor, and accordingly, navigation efficiency of determining a path of the electronic device may be increased.

The structure of the surface detected by the GPR sensor included in the electronic device according to an embodiment of the disclosure enable navigation of the electronic device even when an error occurs in another active sensor of the electronic device. Because the GPR sensor included in the electronic device provided in the disclosure is not sensitive to presence of light, presence of a person or pet, and a change in location of a furniture, the GPR sensor according to an embodiment of the disclosure may replace an active sensor such as a LIDAR sensor or a camera.

The electronic device, such as a robotic cleaner, may identify a state of a floor surface, for example, whether there is dust or spilt fluid on the surface, via the electronic device including the sensor such as the GPR sensor according to an embodiment of the disclosure. Accordingly, the robotic cleaner may perform cleaning or contamination removal and may continuously perform such contamination removal until the GPR sensor detects removal of contamination. A surface structure detecting sensor such as the GPR sensor included in the electronic device may detect contamination until a radiogram (image) at a certain location completely matches an original radiogram at the certain location stored in a DB.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method comprising:
   emitting, by at least one processor of an electronic device, a first signal in a direction of a surface by using a first sensor;
   based on the emitting of the first signal, receiving, by the at least one processor, a second signal reflected from a structure of the surface or a structure of a subsurface of the surface;

based on the second signal, obtaining, by the at least one processor, an image of the structure of the surface or the structure of the subsurface;

determining, by the at least one processor, whether there is a correlation between the obtained image and an image among at least one of images pre-stored in the electronic device, wherein each of the at least one of images pre-stored in the electronic device includes corresponding location information;

in response to determining that there is the correlation between the obtained image and the image pre-stored in the electronic device, determining, by the at least one processor, a location of the electronic device based on the corresponding location information included in the image pre-stored in the electronic device; and in response to determining that there is no correlation between the obtained image and the at least one of images pre-stored in the electronic device, determining, by the at least one processor, the location of the electronic device by using surrounding environment information obtained through a second sensor, and storing, by the at least one processor, the obtained image including the determined location as the corresponding location information, wherein the first sensor comprises at least one of a ground-penetrating radar (GPR) sensor or a surface-penetrating radar (SPR) sensor.

2. The method of claim 1, further comprising:
in response to it being impossible for the at least one processor to determine the location of the electronic device using the surrounding environment information, outputting, by the at least one processor, information indicating a loss of orientation of the electronic device.

3. The method of claim 1, wherein the storing of the obtained image including the determined location as the corresponding location information comprises:

updating, by the at least one processor, a database by adding, to the database, the obtained image including the determined location; or determining, by the at least one processor, that the structure of the surface has changed, and updating, by the at least one processor, the database by changing at least one pre-stored image corresponding to the determined location to the obtained image.

4. An electronic device comprising:
a first sensor configured to obtain an image of a structure of a surface or a structure of a subsurface of the surface;
at least one second sensor configured to obtain surrounding environment information of the electronic device;
a memory storing a program including at least one instruction; and
at least one processor configured to execute the at least one instruction stored in the memory to cause the at least one processor to:
control the first sensor to emit a first signal in a direction of the surface,
receive a second signal reflected from the structure of the surface or the structure of the subsurface,
based on the second signal, obtain the image of the structure of the surface or the structure of the subsurface,
determine whether there is a correlation between the obtained image and an image among at least one of images pre-stored in the memory, wherein each of the at least one of images pre-stored in the memory includes corresponding location information,
in response to determining that there is a correlation between the obtained image and the image pre-stored in the memory, determine a location of the electronic device based on the corresponding location information included in the image pre-stored in the memory, and
in response to determining that there is no correlation between the obtained image and the at least one of images pre-stored in the memory, determine the location of the electronic device by using the surrounding environment information obtained through the at least one second sensor, and store the obtained image including the determined location as the corresponding location information, wherein the first sensor comprises at least one of a ground-penetrating radar (GPR) sensor or a surface-penetrating radar (SPR) sensor.

5. The electronic device of claim 4,
wherein the first sensor comprises:
at least one antenna;
at least one transmitter; and
at least one receiver,
wherein the at least one antenna comprises a current redistribution layer and a transceiver layer including two or more arms,
wherein the two or more arms are configured to switch between a transmitting state and a receiving state, and
wherein the at least one transmitter and the at least one receiver are each located directly on the two or more arms.

6. The electronic device of claim 5, wherein the at least one antenna comprises an ultra-wideband (UWB) microwave antenna.

7. The electronic device of claim 5, wherein the transceiver layer is a butterfly type.

8. The electronic device of claim 5, wherein at least one of the at least one receiver is located on one of the two or more arms and at least one of the at least one transmitter is located on another one of the two or more arms.

9. The electronic device of claim 5, wherein at least one of the at least one receiver and at least one of the at least one transmitter are located on one of the two or more arms.

10. The electronic device of claim 5, wherein a first pair of a first one of the at least one receiver and a first one of the at least one transmitter is located on a first one of the two or more arms and a second pair of a second one of the at least one receiver and a second one of the at least one transmitter is located on a second one of the two or more arms.

11. The electronic device of claim 5, wherein a pair of a first one of the at least one receiver and a first one of the at least one transmitter is located on a first one of the two or more arms and at least one second one of the at least one transmitter is located on a second one of the two or more arms.

12. The electronic device of claim 5, wherein a pair of a first one of the at least one receiver and a first one of the at least one transmitter is located on a first one of the two or more arms and at least one second one of the at least one receiver is located on a second one of the two or more arms.

13. The electronic device of claim 5, wherein the first sensor is located on a bottom surface of the electronic device.

14. The electronic device of claim 5, wherein the first sensor is arranged on the electronic device at a pre-set angle from the surface.

15. The electronic device of claim 14, wherein the first sensor is located on a front surface of the electronic device.

16. The electronic device of claim 14, wherein the first sensor is located on a rear surface of the electronic device.

17. The electronic device of claim 4, wherein the at least one second sensor comprises an active sensor configured to obtain the surrounding environment information of the electronic device.

18. The electronic device of claim 17, wherein the at least one second sensor includes at least one of a camera or a light detection and ranging (LIDAR) sensor.

19. The method of claim 1,
wherein the first sensor further comprises an antenna including a transceiver layer having two or more arms, and
wherein a transmitter and a receiver are located directly on the two or more arms.

\* \* \* \* \*